United States Patent
Lee et al.

(10) Patent No.: US 11,350,328 B2
(45) Date of Patent: May 31, 2022

(54) METHOD FOR PERFORMING A HANDOVER PROCEDURE IN A WIRELESS COMMUNICATION SYSTEM AND A DEVICE THEREFOR

(71) Applicant: LG ELECTRONICS INC., Seoul (KR)

(72) Inventors: Jaewook Lee, Seoul (KR); Sangwon Kim, Seoul (KR); Youngdae Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 74 days.

(21) Appl. No.: 16/622,574

(22) PCT Filed: Jun. 15, 2018

(86) PCT No.: PCT/KR2018/006772
§ 371 (c)(1),
(2) Date: Dec. 13, 2019

(87) PCT Pub. No.: WO2018/230997
PCT Pub. Date: Dec. 20, 2018

(65) Prior Publication Data
US 2021/0297909 A1    Sep. 23, 2021

Related U.S. Application Data

(60) Provisional application No. 62/519,875, filed on Jun. 15, 2017.

(51) Int. Cl.
*H04W 36/00* (2009.01)
*H04W 74/08* (2009.01)

(52) U.S. Cl.
CPC . *H04W 36/00835* (2018.08); *H04W 36/0077* (2013.01); *H04W 36/0079* (2018.08); *H04W 36/00837* (2018.08); *H04W 74/0833* (2013.01)

(58) Field of Classification Search
CPC ........ H04W 36/0058; H04W 36/0061; H04W 36/0072; H04W 36/0077;
(Continued)

(56) References Cited

U.S. PATENT DOCUMENTS

| | | |
|---|---|---|
| 7,110,766 B1 | 9/2006 | Tayloe et al. |
| 9,504,082 B2 | 11/2016 | Johansson et al. |

(Continued)

FOREIGN PATENT DOCUMENTS

| | | |
|---|---|---|
| CN | 101572920 | 11/2009 |
| CN | 101848506 | 9/2010 |

(Continued)

OTHER PUBLICATIONS

PCT International Application No. PCT/KR2018/006772, Notification of Transmittal of the International Search Report and the Written Opinion of the International Searching Authority, or Declaration dated Sep. 21, 2018, 10 pages.

(Continued)

*Primary Examiner* — Kan Yuen
(74) *Attorney, Agent, or Firm* — Lee Hong Degerman Kang Waimey

(57) ABSTRACT

The present invention relates to a wireless communication system. More specifically, the present invention relates to a method and a device for receiving handover assistance information including a list of one or more candidate target cells; initiating a first random access procedure to a first candidate target cell of the one or more candidate target cells and a first timer for the first candidate target cell, when the first candidate target cell satisfies a handover condition; and stopping trying to connect to the first candidate target cell when any one of at least the following events occurs: (i) the first timer expires for the first candidate target cell, and (ii)

(Continued)

a number of random access trials to the first candidate target cell reaches a maximum number.

8 Claims, 13 Drawing Sheets

(58) Field of Classification Search
CPC .......... H04W 36/00835; H04W 36/04; H04W 48/20; H04W 74/0833; H04W 76/30; H04W 76/38
See application file for complete search history.

(56) References Cited

U.S. PATENT DOCUMENTS

| | | | | |
|---|---|---|---|---|
| 2010/0316034 | A1* | 12/2010 | Burbidge | H04W 36/14 370/338 |
| 2010/0330993 | A1* | 12/2010 | Kone | H04W 36/0079 455/436 |
| 2013/0242898 | A1* | 9/2013 | Johansson | H04W 76/18 370/329 |
| 2014/0126545 | A1 | 5/2014 | Tamura et al. | |
| 2016/0174124 | A1 | 6/2016 | Basu Mallick et al. | |
| 2016/0174282 | A1* | 6/2016 | Grant | H04W 76/19 455/422.1 |
| 2016/0205660 | A1* | 7/2016 | Ryu | H04W 72/042 455/458 |
| 2016/0285679 | A1* | 9/2016 | Dudda | H04W 36/0055 |
| 2017/0034866 | A1 | 2/2017 | Wager et al. | |
| 2017/0078933 | A1 | 3/2017 | Li et al. | |
| 2017/0311217 | A1* | 10/2017 | Jung | H04W 48/08 |
| 2018/0070278 | A1* | 3/2018 | Uemura | H04W 36/24 |
| 2018/0124648 | A1* | 5/2018 | Park | H04W 36/0005 |

FOREIGN PATENT DOCUMENTS

| | | |
|---|---|---|
| CN | 103781136 | 5/2014 |
| CN | 105228200 | 1/2016 |
| CN | 106162762 | 7/2019 |
| EP | 2205021 | 7/2010 |
| EP | 2696624 | 2/2014 |
| EP | 3054725 | 8/2016 |
| JP | 2010506506 | 2/2010 |
| JP | 2012514405 | 6/2012 |
| JP | 2017507565 | 3/2017 |
| KR | 20090111434 | 10/2009 |
| KR | 20170014398 | 2/2017 |
| WO | 2013024574 | 2/2013 |
| WO | 2016130062 | 8/2016 |
| WO | 2016153026 | 9/2016 |
| WO | 2017076373 | 5/2017 |

OTHER PUBLICATIONS

European Patent Office Application Serial No. 18818958.3, Search Report dated Jan. 26, 2021, 9 pages.
State Intellectual Property Office of the People's Republic of China Application Serial No. 201880051269.9, Office Action dated Jul. 22, 2021, 8 pages.
Ericsson, "Conditional Handover," R2-1700864, 3GPP TSG-RAN WG2 #97, Jan. 2017, 5 pages.
Japan Patent Office Application No. 2019-569488, Office Action dated Nov. 9, 2021, 10 pages.

* cited by examiner

【Figure 1】
--PRIOR ART--
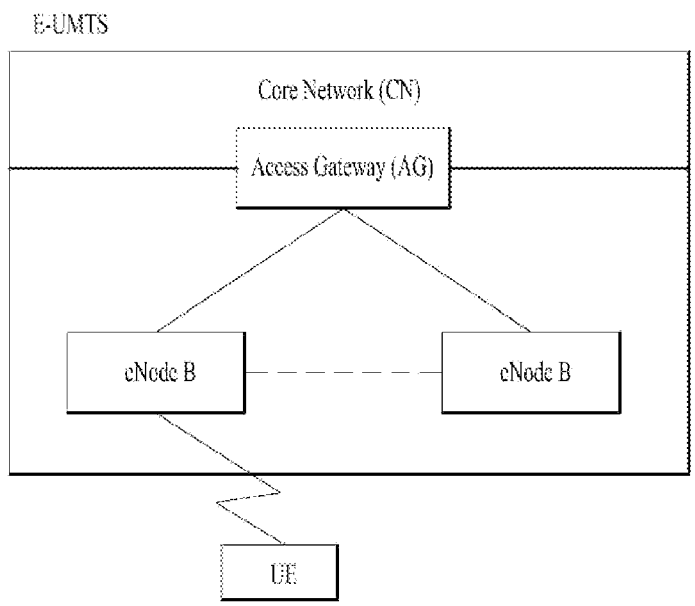

【Figure 2A】
--PRIOR ART--
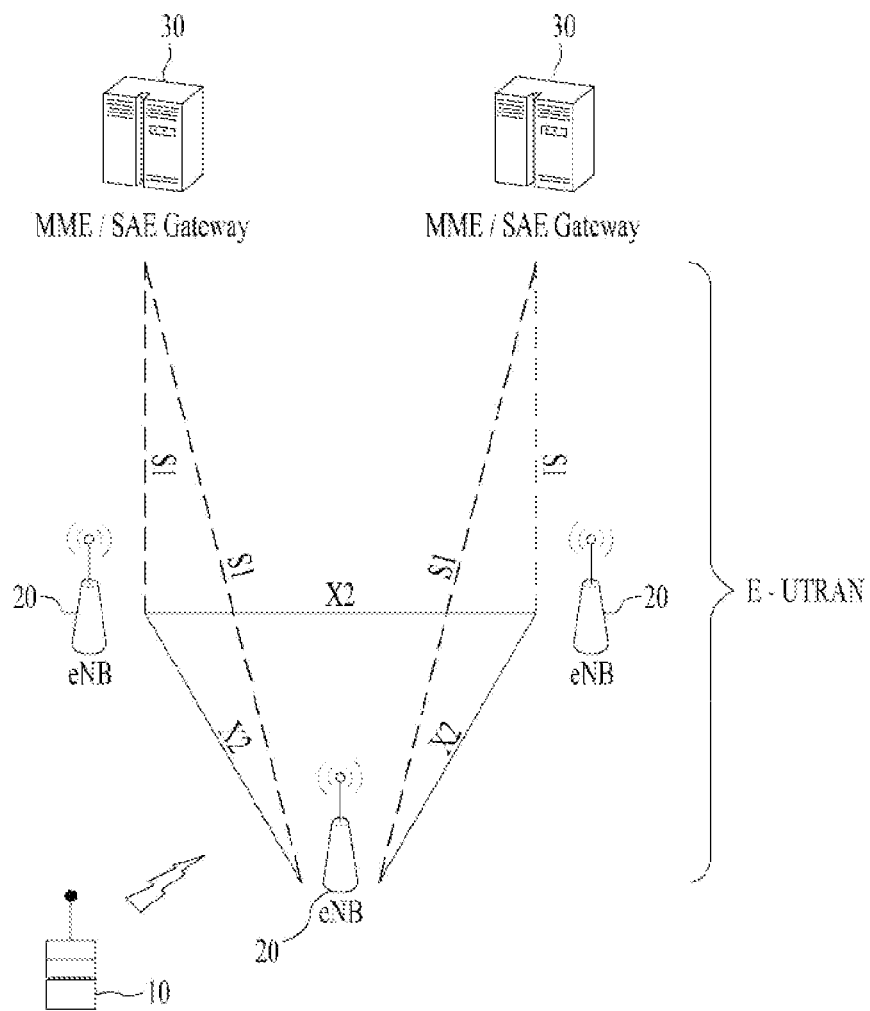

[Figure 2B]
--PRIOR ART--
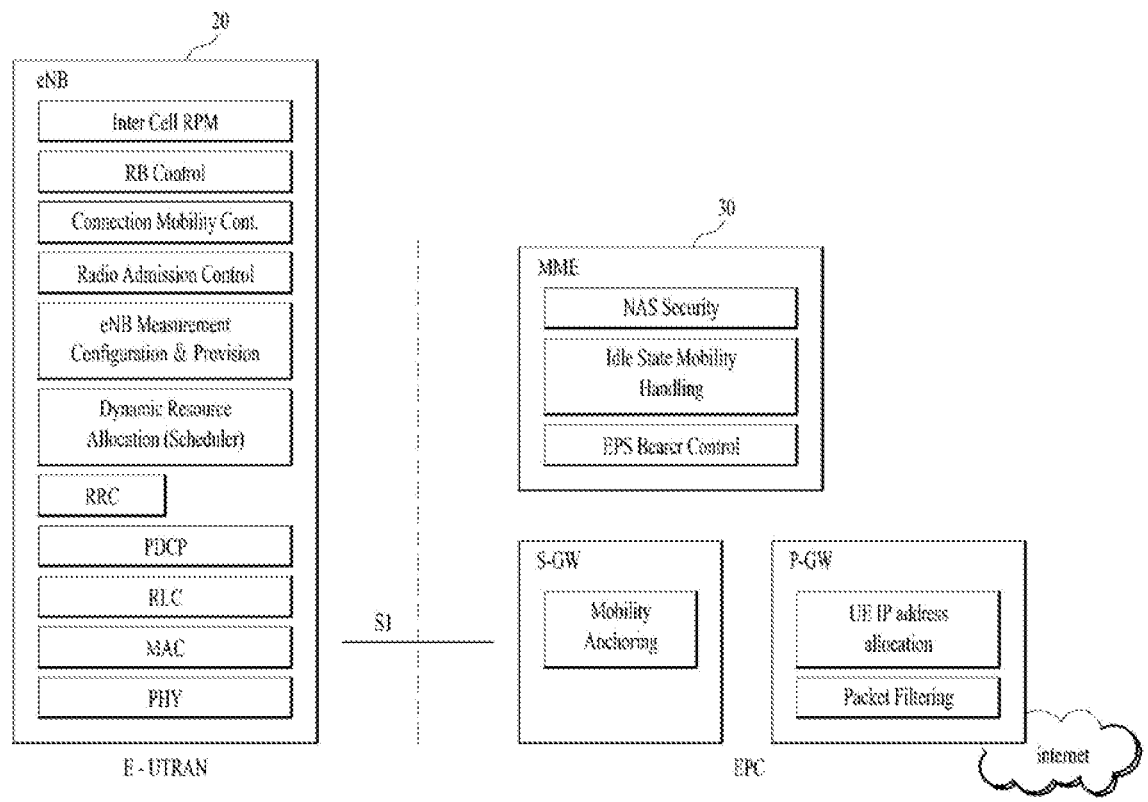

【Figure 3】
--PRIOR ART--
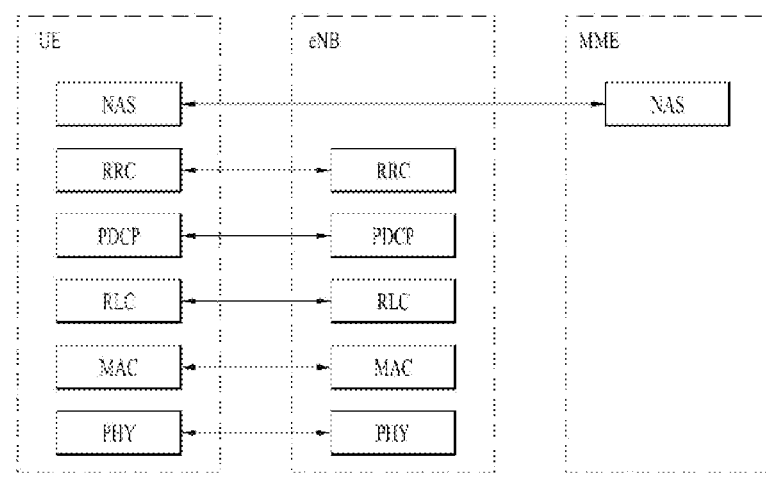
(a) Control-Plane Protocol Stack
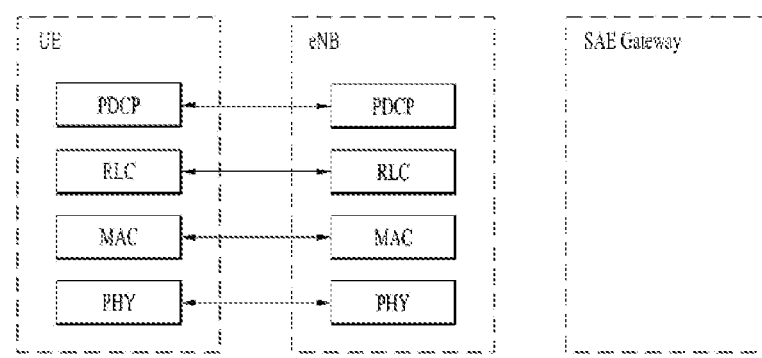
(b) User-Plane Protocol Stack 【Figure 4A】
--PRIOR ART--
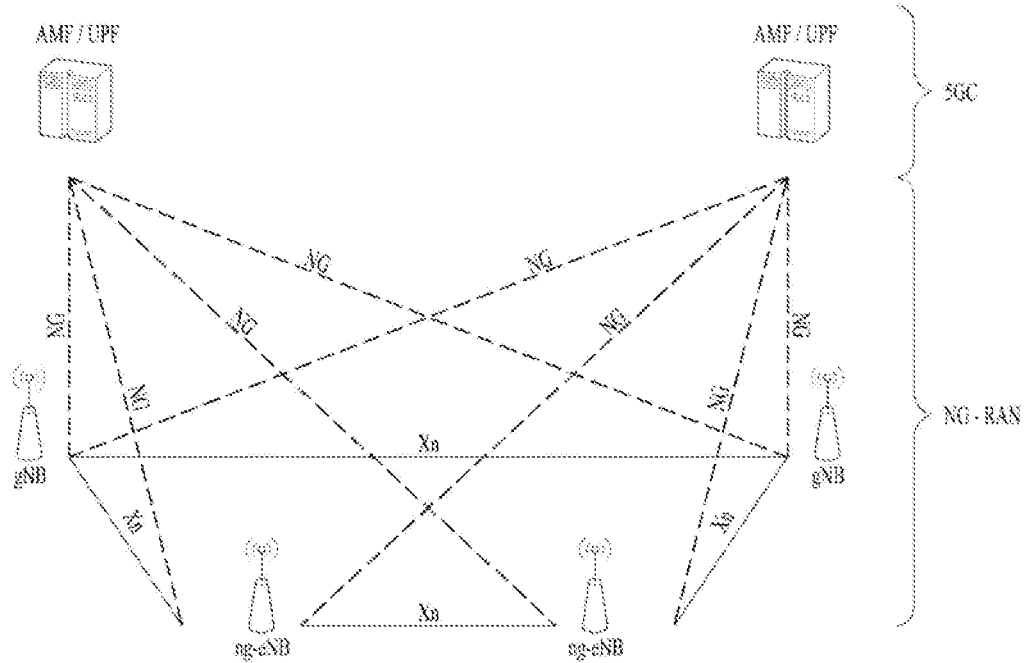

【Figure 4B】
--PRIOR ART--
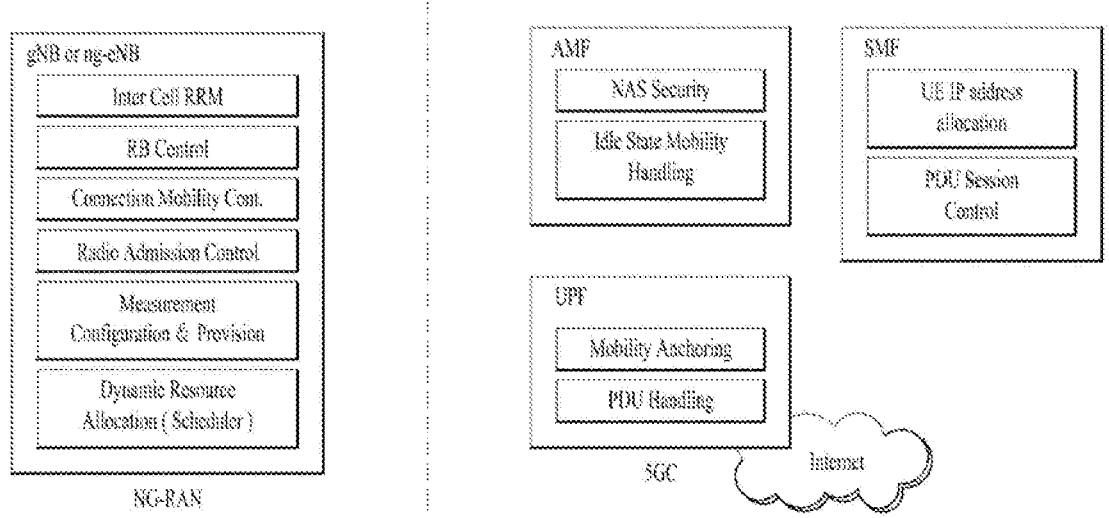

[Figure 5]
--PRIOR ART--
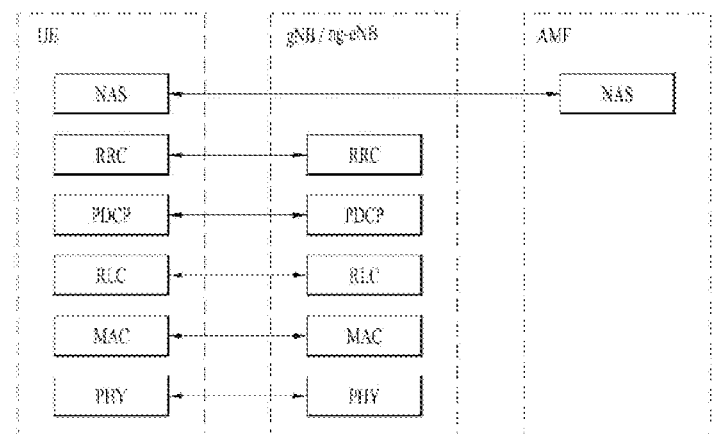
(a) Control-Plane Protocol Stack
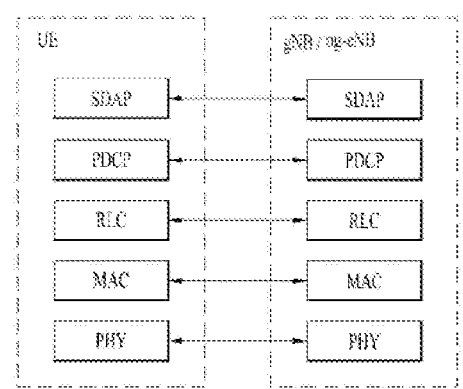
(b) User-Plane Protocol Stack 【Figure 6A】
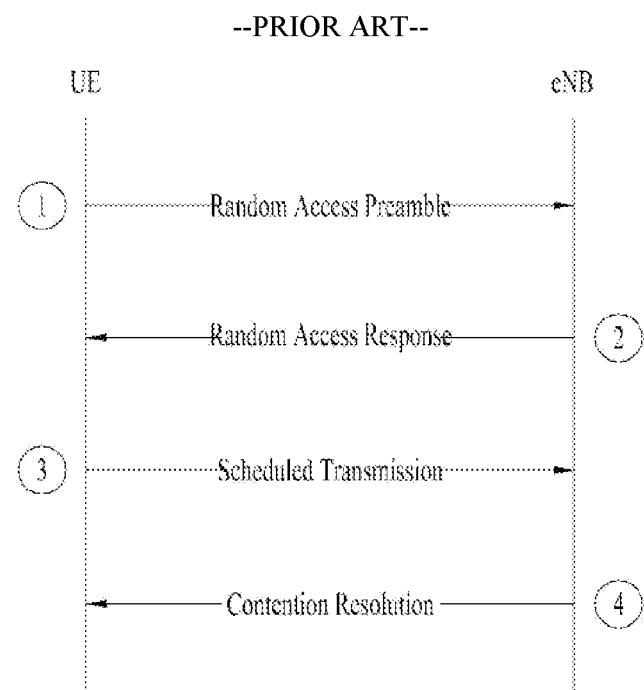

【Figure 6B】
--PRIOR ART--
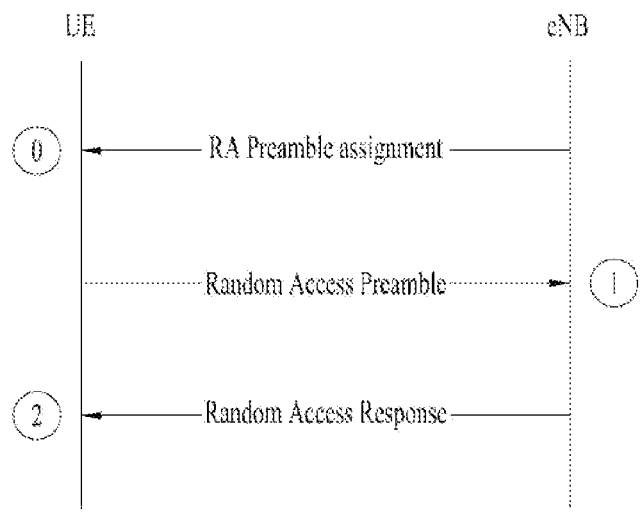
【Figure 7】
--PRIOR ART--
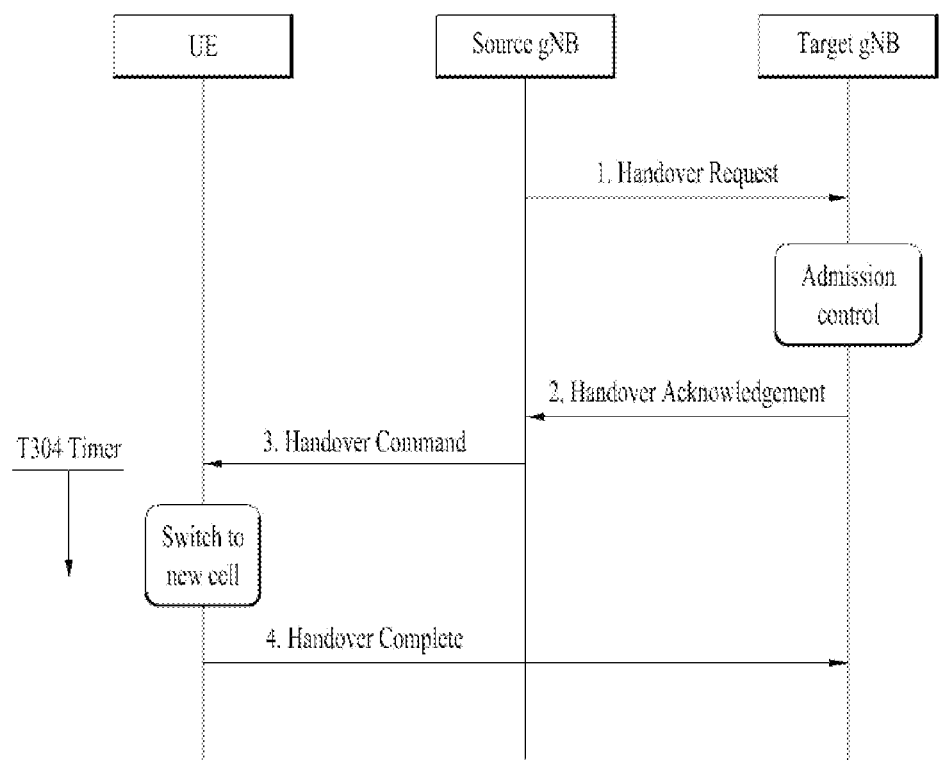

【Figure 8】
--PRIOR ART--
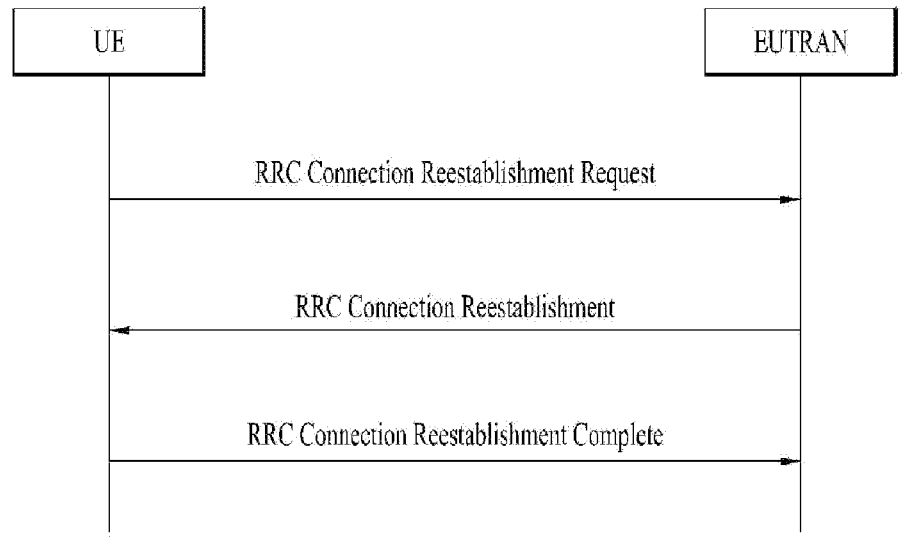
(a) RRC connection re-establishment, Successful
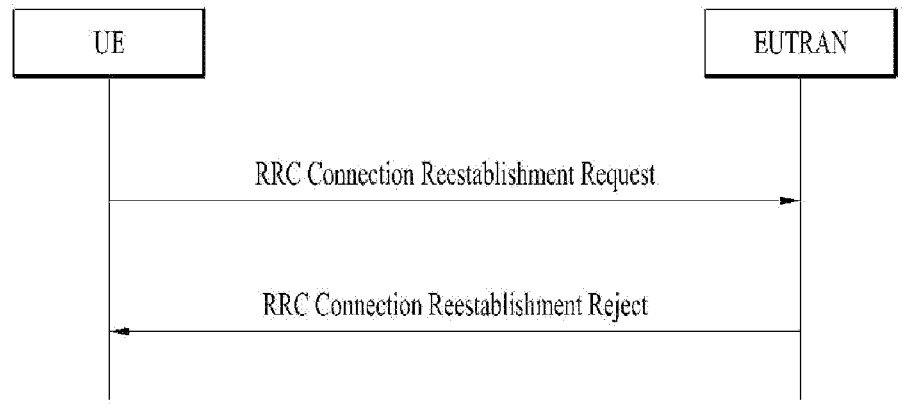
(b) RRC connection re-establishment, failure 【Figure 9】
--PRIOR ART--
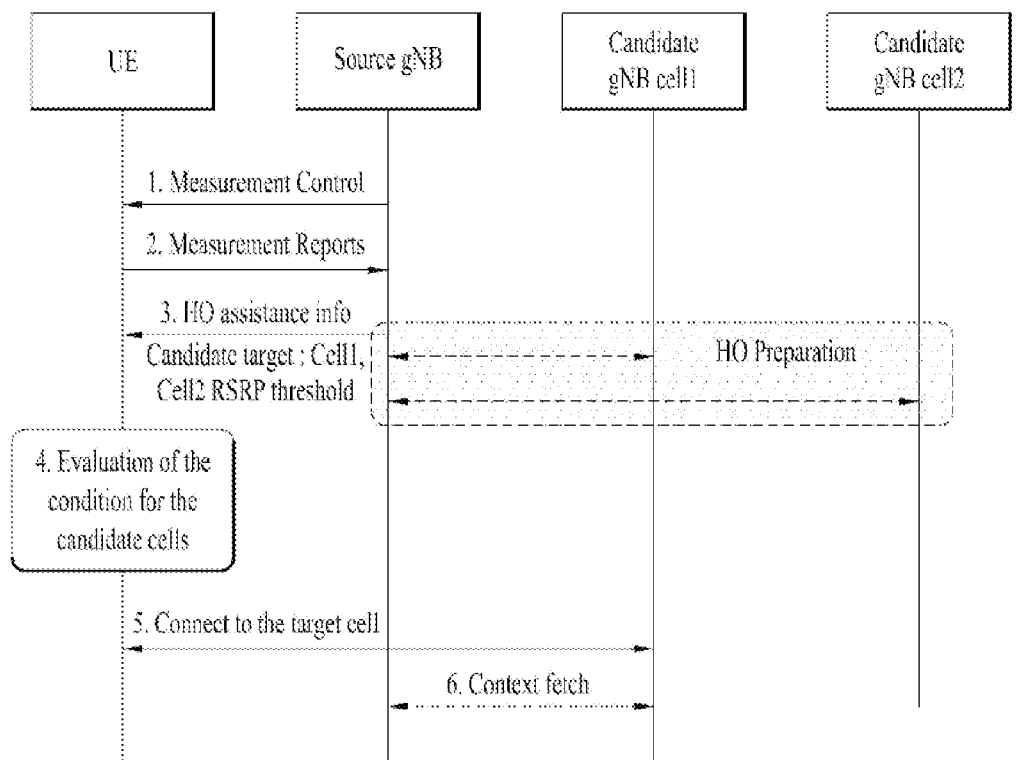

[Fig. 10]
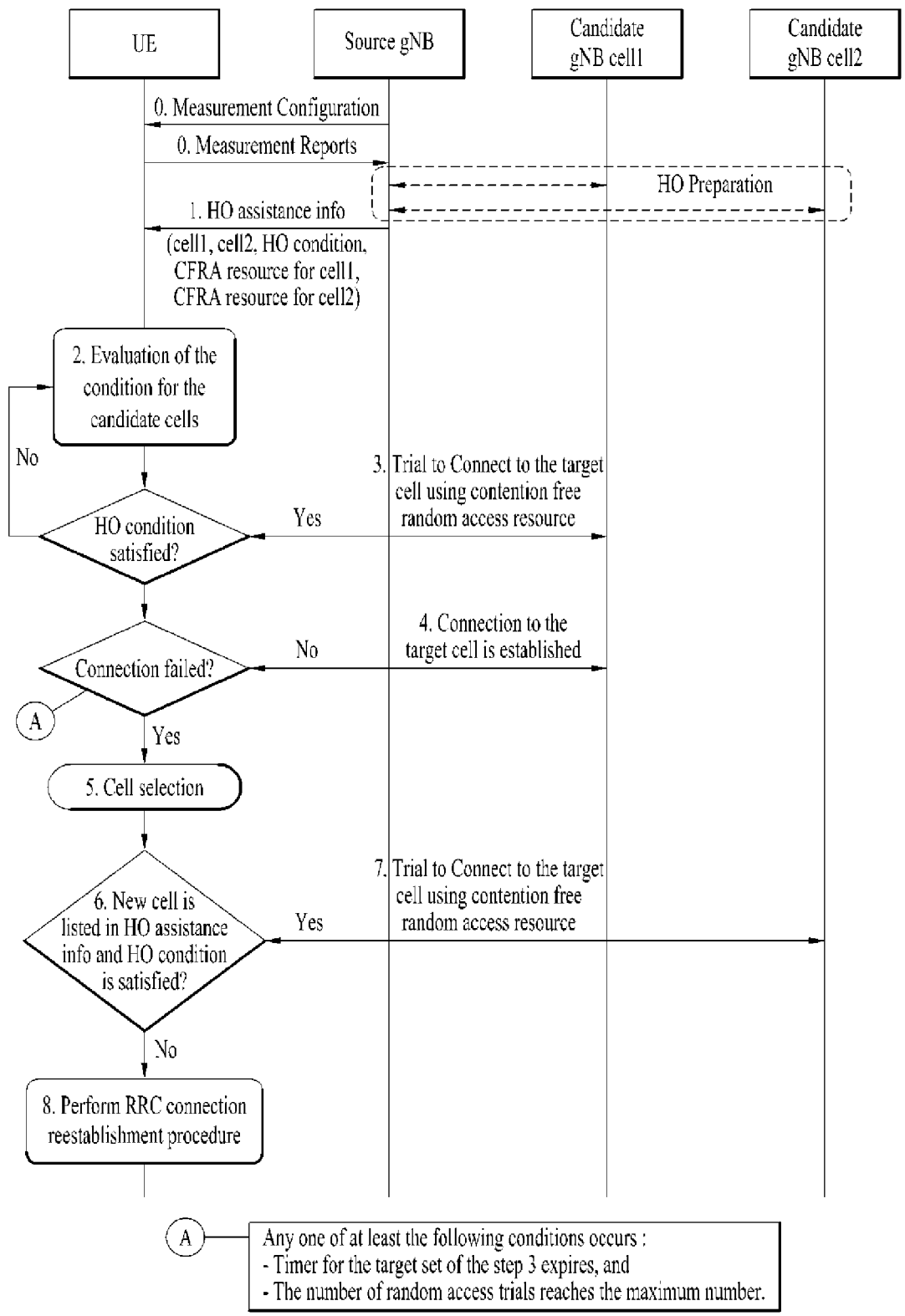

[Fig. 11]
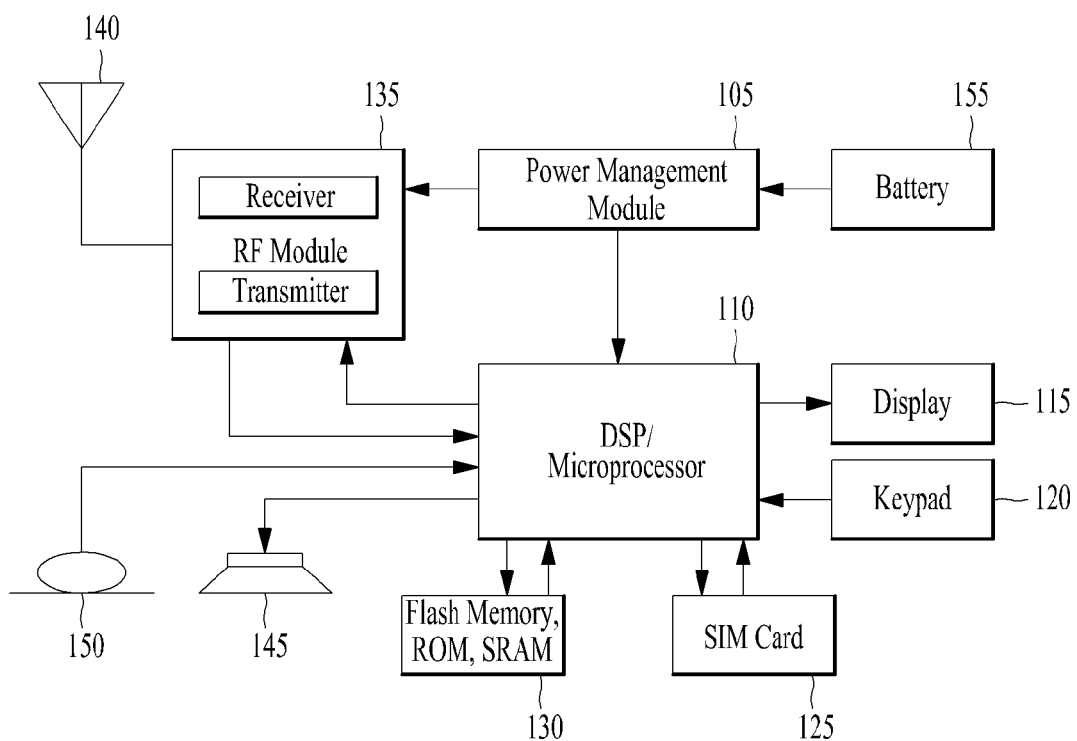

METHOD FOR PERFORMING A HANDOVER PROCEDURE IN A WIRELESS COMMUNICATION SYSTEM AND A DEVICE THEREFOR

CROSS-REFERENCE TO RELATED APPLICATIONS

This application is the National Stage filing under 35 U.S.C. 371 of International Application No. PCT/KR2018/006772, filed on Jun. 15, 2018, which claims the benefit of U.S. Provisional Application No. 62/519,875, filed on Jun. 15, 2017, the contents of which are all hereby incorporated by reference herein in their entirety.

TECHNICAL FIELD

The present invention relates to a wireless communication system and, more particularly, to a method for performing a handover procedure in a wireless communication system and a device therefor.

BACKGROUND ART

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an Evolved Universal Mobile Telecommunications System (E-UMTS) as an exemplary radio communication system. The E-UMTS is an advanced version of a conventional Universal Mobile Telecommunications System (UMTS) and basic standardization thereof is currently underway in the 3GPP. E-UMTS may be generally referred to as a Long Term Evolution (LTE) system. The communication network is widely deployed to provide a variety of communication services such as voice (VoIP) through IMS and packet data.

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE and NR based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

As more and more communication devices demand larger communication capacity, there is a need for improved mobile broadband communication compared to existing RAT. Also, massive machine type communication (MTC), which provides various services by connecting many devices and objects, is one of the major issues to be considered in the next generation communication (NR, New Radio). In addition, a communication system design considering a service/UE sensitive to reliability and latency is being discussed. The introduction of next-generation RAT, which takes into account such Enhanced Mobile BroadBand (eMBB) transmission, and ultra-reliable and low latency communication (URLLC) transmission, is being discussed.

DISCLOSURE

Technical Problem

An object of the present invention is to provide a method and device for efficiently performing a handover procedure in a wireless communication system.

The technical problems solved by the present invention are not limited to the above technical problems and those skilled in the art may understand other technical problems from the following description.

Technical Solution

As an aspect of the present invention, a method for a user equipment (UE) to perform a handover procedure in a wireless communication system is provided, wherein the method comprises: receiving handover assistance information including a list of one or more candidate target cells; initiating a first random access procedure to a first candidate target cell of the one or more candidate target cells and a first timer for the first candidate target cell, when the first candidate target cell satisfies a handover condition; and stopping trying to connect to the first candidate target cell when any one of at least the following events occurs: (i) the first timer expires for the first candidate target cell, and (ii) a number of random access trials to the first candidate target cell reaches a maximum number.

Preferably, the list of one or more candidate target cells may include information about a plurality of candidate target cells, and the method may further comprise: checking whether there is any candidate target cell among the plurality of candidate target cells, except the first candidate target cell, satisfies the handover condition, when any one of at least the following events occurs: (i) the first timer expires for the first candidate target cell, and (ii) the number of random access trials to the first candidate target cell reaches the maximum number.

Preferably, the method may further comprise: initiating a second random access procedure to a second candidate target cell of the plurality of candidate target cells and a second timer for the second candidate target cell, when the second candidate target cell satisfies the handover condition as a result of the checking.

Preferably, the method may further comprise: initiating a third timer when the handover assistance information is received; and performing a radio resource control (RRC) connection re-establishment procedure when the third timer expires.

Preferably, the number of random access trials may include a number of random access preamble transmissions.

Preferably, the satisfying the handover condition may include that a channel quality of the first candidate target cell is equal to or above a threshold value during a certain amount of time.

As another aspect of the present invention, a User Equipment (UE) for operating in a wireless communication system is provided, wherein the UE comprises: a Radio Frequency (RF) module; and a processor operably coupled with the RF module and configured to: receive handover assistance information including a list of one or more candidate target cells, initiate a first random access procedure to a first candidate target cell of the one or more candidate target cells and a first timer for the first candidate target cell, when the first candidate target cell satisfies a handover condition, and stop trying to connect to the first candidate target cell when any one of at least the following events occurs: (i) the first timer expires for the first candidate target cell, and (ii) a number of random access trials to the first candidate target cell reaches a maximum number.

Preferably, the list of one or more candidate target cells may include information about a plurality of candidate target cells, and wherein the processor may be further configured to: check whether there is any candidate target cell among the plurality of candidate target cells, except the first candidate target cell, satisfies the handover condition, when any one of at least the following events occurs: (i) the first timer expires for the first candidate target cell, and (ii) the number of random access trials to the first candidate target cell reaches the maximum number.

Preferably, the processor may be further configured to: initiate a second random access procedure to a second candidate target cell of the plurality of candidate target cells and a second timer for the second candidate target cell, when the second candidate target cell satisfies the handover condition as a result of the checking.

Preferably, the processor may be further configured to: initiate a third timer when the handover assistance information is received, and perform a radio resource control (RRC) connection re-establishment procedure when the third timer expires.

Preferably, the number of random access trials may include a number of random access preamble transmissions.

Preferably, the satisfying the handover condition may include that a channel quality of the first candidate target cell, is equal to or above a threshold value during a certain amount of time.

Advantageous Effects

According to the present invention, a handover procedure can be efficiently performed in a wireless communication system.

It will be appreciated by persons skilled in the art that the effects achieved by the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

FIG. 1 is a diagram showing a network structure of an Evolved Universal Mobile Telecommunications System (E-UMTS) as an example of a wireless communication system;

FIG. 2A is a block diagram illustrating network structure of an evolved universal mobile telecommunication system (E-UMTS), and FIG. 2B is a block diagram depicting architecture of a typical E-UTRAN and a typical EPC;

FIG. 3 is a diagram showing a control plane and a user plane of a radio interface protocol between a UE and an E-UTRAN based on a 3rd generation partnership project (3GPP) radio access network standard;

FIG. 4A is a block diagram illustrating network structure of NG Radio Access Network (NG-RAN) architecture, and FIG. 4B is a block diagram depicting architecture of functional Split between NG-RAN and 5G Core Network (5GC);

FIG. 5 is a diagram showing a control plane and a user plane of a radio interface protocol between a UE and a NG-RAN based on a 3rd generation partnership project (3GPP) radio access network standard;

FIGS. 6A and 6B illustrate random access procedures.

FIG. 7 shows a procedure of an inter-gNB handover.

FIG. 8 shows a procedure of a connection re-establishment procedure.

FIG. 9 shows a procedure of a condition-based handover.

FIG. 10 shows a handover procedure according to an example of the present invention.

FIG. 11 is a block diagram of a communication apparatus according to an embodiment of the present invention.

MODE FOR INVENTION

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

FIG. 2A is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2A, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

FIG. 2B is a block diagram depicting architecture of a typical E-UTRAN and a typical EPC.

As illustrated in FIG. 2B, an eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

FIG. 4A is a block diagram illustrating network structure of NG Radio Access Network (NG-RAN) architecture, and FIG. 4B is a block diagram depicting architecture of functional Split between NG-RAN and 5G Core Network (5GC).

An NG-RAN node is a gNB, providing NR user plane and control plane protocol terminations towards the UE, or an ng-eNB, providing E-UTRA user plane and control plane protocol terminations towards the UE.

The gNBs and ng-eNBs are interconnected with each other by means of the Xn interface. The gNBs and ng-eNBs are also connected by means of the NG interfaces to the 5GC, more specifically to the AMF (Access and Mobility Management Function) by means of the NG-C interface and to the UPF (User Plane Function) by means of the NG-U interface.

The Xn Interface includes Xn user plane (Xn-U), and Xn control plane (Xn-C). The Xn User plane (Xn-U) interface is defined between two NG-RAN nodes. The transport network layer is built on IP transport and GTP-U is used on top of UDP/IP to carry the user plane PDUs. Xn-U provides non-guaranteed delivery of user plane PDUs and supports the following functions: i) Data forwarding, and ii) Flow control. The Xn control plane interface (Xn-C) is defined between two NG-RAN nodes. The transport network layer is built on SCTP on top of IP. The application layer signalling protocol is referred to as XnAP (Xn Application Protocol). The SCTP layer provides the guaranteed delivery of application layer messages. In the transport IP layer point-to-point transmission is used to deliver the signalling PDUs. The Xn-C interface supports the following functions: i) Xn interface management, ii) UE mobility management, including context transfer and RAN paging, and iii) Dual connectivity.

The NG Interface includes NG User Plane (NG-U) and NG Control Plane (NG-C). The NG user plane interface (NG-U) is defined between the NG-RAN node and the UPF. The transport network layer is built on IP transport and GTP-U is used on top of UDP/IP to carry the user plane PDUs between the NG-RAN node and the UPF. NG-U provides non-guaranteed delivery of user plane PDUs between the NG-RAN node and the UPF.

The NG control plane interface (NG-C) is defined between the NG-RAN node and the AMF. The transport network layer is built on IP transport. For the reliable transport of signalling messages, SCTP is added on top of IP. The application layer signalling protocol is referred to as NGAP (NG Application Protocol). The SCTP layer provides guaranteed delivery of application layer messages. In the transport, IP layer point-to-point transmission is used to deliver the signalling PDUs.

NG-C provides the following functions: i) NG interface management, ii) UE context management, iii) UE mobility management, iv) Configuration Transfer, and v) Warning Message Transmission.

The gNB and ng-eNB host the following functions: i) Functions for Radio Resource Management: Radio Bearer Control, Radio Admission Control, Connection Mobility Control, Dynamic allocation of resources to UEs in both uplink and downlink (scheduling), ii) IP header compression, encryption and integrity protection of data, iii) Selection of an AMF at UE attachment when no routing to an AMF can be determined from the information provided by the UE, iv) Routing of User Plane data towards UPF(s), v) Routing of Control Plane information towards AMF, vi) Connection setup and release, vii) Scheduling and transmission of paging messages (originated from the AMF), viii) Scheduling and transmission of system broadcast information (originated from the AMF or O&M), ix) Measurement and measurement reporting configuration for mobility and scheduling, x) Transport level packet marking in the uplink, xi) Session Management, xii) Support of Network Slicing, and xiii) QoS Flow management and mapping to data radio bearers. The Access and Mobility Management Function (AMF) hosts the following main functions: i) NAS signalling termination, ii) NAS signalling security, iii) AS Security control, iv) Inter CN node signalling for mobility between 3GPP access networks, v) Idle mode UE Reachability (including control and execution of paging retransmission), vi) Registration Area management, vii) Support of intra-system and inter-system mobility, viii) Access Authentication, ix) Mobility management control (subscription and policies), x) Support of Network Slicing, and xi) SMF selection.

The User Plane Function (UPF) hosts the following main functions: i) Anchor point for Intra-/Inter-RAT mobility (when applicable), ii) External PDU session point of interconnect to Data Network, iii) Packet inspection and User plane part of Policy rule enforcement, iv) Traffic usage reporting, v) Uplink classifier to support routing traffic flows to a data network, vi) QoS handling for user plane, e.g. packet filtering, gating, UL/DL rate enforcement, and vii) Uplink Traffic verification (SDF to QoS flow mapping).

The Session Management function (SMF) hosts the following main functions: i) Session Management, ii) UE IP address allocation and management, iii) Selection and control of UP function, iv) Configures traffic steering at UPF to route traffic to proper destination, v) Control part of policy enforcement and QoS, vi) Downlink Data Notification.

FIG. 5 is a diagram showing a control plane and a user plane of a radio interface protocol between a UE and a NG-RAN based on a 3rd generation partnership project (3GPP) radio access network standard.

The user plane protocol stack contains Phy, MAC, RLC, PDCP and SDAP (Service Data Adaptation Protocol) which is newly introduced to support 5G QoS model.

The main services and functions of SDAP entity include i) Mapping between a QoS flow and a data radio bearer, and ii) Marking QoS flow ID (QFI) in both DL and UL packets. A single protocol entity of SDAP is configured for each individual PDU session.

At the reception of an SDAP SDU from upper layer for a QoS flow, the transmitting SDAP entity may map the SDAP SDU to the default DRB if there is no stored QoS flow to DRB mapping rule for the QoS flow. If there is a stored QoS flow to DRB mapping rule for the QoS flow, the SDAP entity may map the SDAP SDU to the DRB according to the stored QoS flow to DRB mapping rule. And the SDAP entity may construct the SDAP PDU and deliver the constructed SDAP PDU to the lower layers.

A description will be given of a random access procedure. The random access (RA) procedure is also referred to as a random access channel (RACH) procedure. The random access procedure is used for initial access, uplink synchronization control, resource assignment, handover, etc. The random access procedure is classified into contention-based procedure and a dedicated (i.e. non-contention-based) procedure. In the contention-based random access procedure, a UE randomly selects an RACH preamble sequence. Accordingly, a plurality of UE can simultaneously transmit the same RACH preamble sequence, which requires a contention resolution procedure. In the dedicated random access procedure, a UE uses an RACH preamble sequence uniquely allocated thereto by a BS. Accordingly, the UE can perform the random access procedure without collision with other UEs.

FIGS. 6A and 6B illustrate random access procedures. FIG. 6A shows a contention-based random access procedure and FIG. 6B shows a dedicated random access procedure.

Referring to FIG. 6A, the contention-based random access procedure includes the following four steps. Messages transmitted in steps 1 to 4 may be respectively referred to as messages (Msgs) 1 to 4. The contention-based random access procedure is initiated by the MAC sublayer of a UE.

Step 1: RACH preamble (via PRACH) (UE=>eNB)
Step 2: Random access response (RAR) (via PDCCH and PDSCH) (eNB=>UE)
Step 3: Layer2/Layer3 message (e.g., CCCH SDU) (via PUSCH) (UE=>eNB)
Step 4: Contention resolution message (e.g., MAC control element (CE) including UE contention resolution identity (hereinafter, UE contention resolution identity MAC CE)) (eNB=>UE)

Referring to FIG. 6B, the dedicated random access procedure includes the following three steps. Messages transmitted in steps 0, 1 and 2 may be respectively referred to as messages (Msgs) 0, 1 and 2. Uplink transmission (i.e. Msg3) corresponding to RAR may be performed as part of the random access procedure, which is not shown in the figure. The dedicated random access procedure is initiated by a PDCCH order. The PDCCH order or a RRC layer optionally indicate a random access preamble and PRACH resource.

Step 0: RACH preamble allocation (PDCCH order) (eNB=>UE)
Step 1: RACH preamble (via PRACH) (UE=>eNB)
Step 2: Random access response (RAR) (via PDCCH and PDSCH) (eNB=>UE)
Step 3 (not shown in FIG. 6B): Layer2/Layer3 message (e.g., MAC CE including C-RNTI (hereinafter, C-RNTI MAC CE)) (via PUSCH) (UE=>eNB)

After transmission of the RACH preamble, the UE attempts to receive a RAR within a time window. Specifically, the UE attempts to detect a PDCCH (hereinafter, RA-RNTI PDCCH) having a RA-RNTI (e.g. CRC in the PDCCH is masked with RA-RNTI) within the time window.

The UE checks whether a PDSCH corresponding to the RA-RNTI PDCCH includes a RAR therefor when RA-RNTI PDCCH is detected. The RAR includes timing advance (TA) information representing a timing offset for UL synchronization, UL resource allocation information (UL grant), a temporary UE identifier (e.g. temporary Cell-RNTI (TC-RNTI)), etc. If the UE fails to receive the RAR, the UE may re-transmit the RACH preamble after back-off. Meanwhile, if the UE receives the RAR, the UE may perform an initial UL transmission (i.e., Msg3) according to the UL grant and the TA information in the RAR.

Contention resolution is based on either C-RNTI on PDCCH (e.g., PDCCH whose CRC is masked with C-RNTI) or UE Contention Resolution Identity on DL-SCH (e.g., UE contention resolution identity MAC CE in a MAC PDU). Specifically, a contention resolution procedure is performed by an MAC entity as follows.

*85Once Msg3 is transmitted, the MAC entity does:
1> start mac-ContentionResolutionTimer and restart mac-ContentionResolutionTimer at each HARQ retransmission of Msg3;
1> if notification of a reception of a PDCCH transmission (e.g., Msg4) is received from a lower layer (e.g., a physical layer), the MAC entity does:
  2> if C-RNTI MAC control element was included in Msg3:
    3> if the random access procedure was initiated by a MAC layer of the UE or by a RRC layer of the BS, and if the PDCCH transmission (e.g., Msg4) is addressed to C-RNTI and contains an UL grant for a new transmission; or
    3> if the random access procedure was initiated by a PDCCH order, and if the PDCCH transmission (e.g., Msg4) is addressed to the C-RNTI:
      4> consider this Contention Resolution successful;
      4> stop mac-ContentionResolutionTimer;
      4> discard the Temporary C-RNTI;
  2> else if CCCH SDU was included in Msg3 and the PDCCH transmission (e.g., Msg4) is addressed to its Temporary C-RNTI:
    3> if MAC PDU (e.g., in a PDSCH of Msg4) is successfully decoded:
      4> stop mac-ContentionResolutionTimer;
      4> if the MAC PDU (e.g., in a PDSCH of Msg4) contains a UE Contention Resolution Identity MAC control element; and
        98 4> if the UE Contention Resolution Identity included in the MAC control element matches the 48 first bits of the CCCH SDU transmitted in Msg3:
          5> consider this Contention Resolution successful and finish the disassembly and demultiplexing of the MAC PDU;
          5> set the C-RNTI to the value of the Temporary C-RNTI;
          5> discard the Temporary C-RNTI;
          5> consider this Random Access procedure successfully completed.
      4> else
        5> discard the Temporary C-RNTI;
        5> consider this Contention Resolution not successful and discard the successfully decoded MAC PDU.
1> if mac-ContentionResolutionTimer expires:
  2> discard the Temporary C-RNTI;
  2> consider the Contention Resolution not successful.

1> if the Contention Resolution is considered not successful the MAC entity does:
   2> flush the HARQ buffer used for transmission of MAC PDU in Msg3 buffer;
   2> based on a backoff parameter, select a random backoff time according to a uniform distribution between 0 and the backoff parameter balue;
   2> delay a subsequent random access transmission by the backoff time;
   2> proceed to a selection of a random access resource and the subsequent Random Access transmission.

Network controlled mobility is applied for the UE in RRC_CONNECTED and is dealt with or without RRC. The RRC driven mobility is responsible for the cell level mobility, i.e., handover. FIG. 7 shows a procedure of an inter-gNB handover. Referring to FIG. 7, the network-controlled handover procedure is performed as follows.

Step 1) The source gNB may make a decision based on a measurement report from the UE and Radio Resource Management (RRM) information to handover the UE. Then, the source gNB initiates a handover procedure and issues a Handover Request to a target gNB over an Xn interface. The Handover Request includes necessary information (e.g., RRC context including the C-RNTI of the UE in the source gNB, AS-configuration, E-RAB context and physical layer ID of the source cell) to prepare the handover at the target gNB side.

Step 2) The target gNB performs admission control and provides RRC configuration as part of a Handover Acknowledgement to the source gNB. The Handover Acknowledgement includes a transparent container to be sent to the UE as an RRC message to perform the handover. The container includes a new C-RNTI, target gNB security algorithm identifiers for the selected security algorithms, may include a dedicated RACH preamble, and possibly some other parameters i.e. access parameters, System Information Blocks (SIBs), etc.

Step 3) The source gNB provides the RRC configuration received from the target gNB to the UE in a Handover Command. The Handover Command message includes at least cell ID and all information required to access the target cell (i.e., target gNB) so that the UE can access the target cell without reading system information. For some cases, the information required for contention-based and contention-free random accesses can be included in the Handover Command message. The access information to the target cell may include beam specific information, if any. The UE starts a timer T304 at a time when the UE received the Handover Command message. Also, the UE may perform a procedure to switch/connect to a new cell (i.e., target cell or gNB). For example, the procedure to switch/connect to a new cell may include a random access procedure. Contention-free and/or contention-based random access can be used depending on whether the Handover Command includes dedicated random access resource, whether the contention-free random access procedure is failed, etc.

Step 4) If the procedure to switch to a new cell (i.e., target cell), the UE moves the RRC connection to the target gNB and replies the Handover Complete.

Meanwhile, if the timer T304 expires, the UE considers the handover procedure failed. If the handover procedure is failed, the UE reverts back to configuration used in the source cell, excluding the configuration configured by, e.g., the physicalConfigDedicated, the mac-MainConfig and the sps-Config and initiate a connection re-establishment procedure.

FIG. 8 shows a procedure of a connection re-establishment procedure. The purpose of this procedure is to re-establish RRC connection, which involves resumption of System Radio Bearer 1 (SRB1) operation, re-activation of security and configuration of only PCell.

Referring to FIG. 8, the UE transmits an RRC connection reestablishment request message to a network (e.g., serving cell or gNB). In this case, the network may accept or reject the RRC connection reestablishment request. If the network accepts the RRC connection reestablishment request, the network transmits an RRC connection reestablishment message to the UE, and then the UE performs an RRC connection reestablishment and transmits an RRC connection reestablishment complete message to the UE. Meanwhile, if the network rejects the RRC connection reestablishment request, the network transmits an RRC connection reestablishment reject message to the UE.

Example: Handover Failure in a Condition-Based Handover

In 3GPP New Radio (NR), one of the candidate handover mechanisms is autonomous condition based handover (or, condition-based handover). In the condition-based handover, a network provides condition(s) and radio resource configuration information for candidate target cells and a UE evaluates the condition(s). If the condition(s) is satisfied for a source cell and/or a target cell, the UE tries to connect to the target cell. If the UE successfully connects to the target cell, the UE applies the configuration of the target cell. The condition-based handover could reduce a time to be taken for transmission of measurement reporting and reception of handover command and handover preparation so that it would be possible to reduce a handover failure caused by not receiving a handover command at a proper time. It may be useful in a situation that channel conditions rapidly change due to beamforming system in high frequencies.

FIG. 9 shows a procedure of the condition-based handover.

Referring to FIG. 9, the UE can be provided with handover assistance information which includes information associated with a set of candidate target cells and conditions (e.g. RSRP) for handover (step 3). The network may determine the set of candidate target cells based on the optionally received measurement report (steps 1~2). Even without the measurement report, the network could provide the handover assistance information. Then, the UE would evaluate the conditions for the candidate target cell list to determine whether to perform a handover procedure to one of the candidate target cells. If the condition is met for a candidate target cell, the UE would perform trying to connect to the candidate target cell (step 5). After connecting to the candidate target cell, the candidate target cell would fetch relevant UE context from the source cell (e.g., gNB) (step 5) or the source cell provides the relevant UE context to the candidate target cell before condition-based handover is performed.

As noted above, a plurality of candidate target cells can be indicated through handover assistance information in the condition-based handover. In this case, when the UE declares a failure of a handover procedure is still not discussed. Thus the present invention provides how to determine a handover failure in view of cell(s), and a condition-based handover procedure considering the handover failure. In the description, the condition-based handover can be interchanged with an autonomous handover.

In order to help understanding, operations related with handover failure (HOF) will be firstly explained. For this purpose, it is assumed that a list of candidate target cell(s) is provided from a network (e.g., source cell) to a UE, and autonomous handover condition is satisfied for source cell and/or one of the candidate target cell(s). In this case, the UE may try to connect to the target cell by using, e.g., a random access procedure. The random access procedure can be performed using contention free random access resources (e.g., time/frequency/dedicated preamble/beam) provided by the network. If there is no provided contention free random access resources for the target cell, the UE may perform a contention-based random access procedure.

In this case, the UE may determine a handover failure (HOF) for one candidate target cell at least in the following cases.

Case 1) The UE may initiate a timer Txxx (e.g., T304) at a time when handover condition for one candidate target cell is satisfied. A value of the timer (i.e., timer value) can be provided as a part of handover assistance information. If the UE considers that the random access procedure to the one candidate target cell is successful (e.g. MAC indicates a successful reception of a PDCCH transmission addressed to C-RNTI), the UE stops the timer. If the above timer expires, the UE considers the handover to the one candidate target cell failed. The timer value can be configured per each candidate target cell (group), or one common timer value can be configured for all candidate target cells.

Case 2) If the number of the random access trials (e.g. the number of preamble transmissions) to the one candidate target cell reaches the maximum threshold number before succeeding a random access to the one candidate target cell, the UE determines that handover to the one candidate target cell is failed. The maximum threshold number can be any positive integer value. The expression "before succeeding a random access" may have the same meaning as an expression "while the timer for the one candidate target cell is running." The maximum threshold number can be configured per each candidate target cell (group), or one maximum threshold number can be configured for all candidate target cells.

At least the two cases can be combined to determine a handover failure for a candidate target cell. For example, the UE may determines a handover failure for a candidate target cell when any one of at least the cases 1 and 2 occurs.

In the conventional network-controlled handover (see, FIG. 8), only one target cell (e.g., gNB) is indicated through a handover command, and a handover failure is determined solely based on a timer (e.g., T304), which is able to provide a plenty of time to try connecting to the indicated target cell in a situation that there is only one candidate target cell. Meanwhile, in the condition-based handover, a plurality of candidate target cells can be indicated through handover assistance information. Thus if such a plenty time is guaranteed for each of the all candidate target cell, it may take too long time to determine handover failures of candidate target cells in proportion to the number of candidate target cells that satisfy autonomous handover condition(s). Thus it may be advantageous to determine a handover failure based on the number of random access trials (e.g. the number of preamble transmissions). However, a random access trial may fail in various steps (e.g., no RAR reception, contention-resolution failure), and so it may also take a longer time than expected to take a predetermined number of random access trials. Thus, by limiting a boundary of time duration that can be used for trying connecting to a candidate target cell based on the timer of case 1, it may be possible to avoid unexpected delay in a handover failure determination for each candidate target cell.

After a handover failure to one candidate target cell, if there is new candidate target cell in the list of the received handover assistance information and if autonomous handover condition for the new candidate target cell and/or serving cell is satisfied, the UE may try to connect to the new candidate target cell, which involves performing a random access procedure to the new candidate target cell using contention-free random access resources (e.g. time/frequency/dedicated preamble/beam) and/or contention-based random access resources until overall handover procedure is considered failed.

The overall handover procedure is considered failed at least in the following cases.

After failing to connect to one candidate target cell, if no new candidate target cell is in the list of the handover assistance information and/or if no new candidate target cell(s) in the list of the handover assistance information satisfies autonomous handover condition(s).

After trying to connect to one candidate target cell autonomously (e.g., performing a random access procedure based on autonomous handover procedure), if the UE does not succeed in autonomous handover procedure before the handover assistance information is not valid anymore. Validity of the handover assistance information can be determined based on whether a corresponding a timer expires. The corresponding time can be started at a time when the handover assistance information is received. The corresponding time stops when the handover is successful to the one of the candidate target cell(s).

If before trying to connect to a candidate target cell, the validity of the received handover assistance information expires, the UE may just discard the received handover assistance information, and consider the overall handover procedure failed. Meanwhile if while trying to connect to a candidate target cell, the validity of the received handover assistance information expires, the UE may wait for a result of on-going handover procedure for the candidate target cell, and then consider the overall handover procedure failed if the on-going handover procedure for the candidate target cell is considered failed. Alternatively, the UE stops the on-going handover procedure (e.g., random access) for the candidate target cell, and considers the overall handover procedure failed.

If the overall handover procedure is considered failed, the UE may perform RRC connection re-establishment procedure. If the overall handover procedure is considered failed and if a source cell related condition is provided in handover assistance information and that source cell related condition is not met (e.g., RSRP of the source cell is good), the UE may not perform RRC connection re-establishment procedure and the UE may keep run the validity timer for the handover assistance information if the timer is not expired.

Meanwhile if while trying to connect to a candidate target cell, the source cell related condition (if provided) is not met (e.g., RSRP of the source cell is above the RSRP threshold), similarly or a condition for the candidate target cell is not met, the UE may wait for a result of on-going handover procedure for the candidate target cell, and then consider the handover to the candidate target cell failed. Alternatively, the UE stops the on-going handover procedure for the candidate target cell. If the validity timer is not expired, the UE may not perform RRC connection re-establishment procedure and the UE keep run the validity timer for the handover assistance information.

FIG. 10 shows a handover (HO) procedure according to an example of the present invention. Referring to FIG. 10, the HO procedure basically comprises of receiving HO assistance information, trying to connect to one cell autonomously if the autonomous HO condition for the one cell is satisfied, determining handover failure (HOF) for the one cell and trying HO to another cell if there is other listed cell in the received handover assistance information which satisfies autonomous HO condition.

Specifically, the HO procedure can be performed as follows.

Step 0) The network (e.g., source cell or gNB) configures measurement configuration, and the UE reports measured results to the network. In this example, the measured results may include information for cell 1 and cell 2. Then, the network may prepare cell 1 and cell 2 as candidate target cells for the UE.

Step 1) The UE receives HO assistance information from the network (via a dedicated signaling). The HO assistance information may include information about at least one of:
  A list of cell identities of one or more candidate target (or neighboring) cells (i.e., a list of cell(s)) (e.g., cell identities of cell 1 and cell 2),
  Radio resource configuration information for each candidate target cell,
  Random access information (e.g. time/frequency/preamble/beam identity) for each candidate target cell,
  Autonomous HO condition, and
  Validity timer value for the HO assistance information.

The autonomous HO condition may include one or more following conditions.
  Channel quality threshold for each candidate target cell. The one common channel quality threshold can be provided for all candidate target cell or individual channel quality threshold for each candidate target cell can be provided. For example, the channel quality threshold may be provided based on Reference Signal Received Power/Reference Signal Received Quality (RSRP/RSRQ).
  Channel quality (based on e.g. RSRP/RSRQ) threshold for serving cell.

After receiving the HO assistance information, the UE sets a validity timer with the received validity timer value and starts the validity timer (from a reception time of the HO assistance information). During the validity timer is running, the UE considers the received handover assistance information valid.

Step 2) After receiving the HO assistance information, the UE measures candidate target cells listed in the received HO assistance information and evaluates the autonomous HO condition. For example, the UE measures channel quantity (e.g., RSRP/RSRQ) used for evaluating the autonomous HO condition and evaluates whether the autonomous HO condition is satisfied for each candidate target cell. For example, if at least one of the followings is satisfied, the UE may determines that the autonomous HO condition is satisfied.
  The UE evaluates whether RSRP/RSRQ of a candidate target cell is equal to and/or above the received channel quality threshold during a certain amount of time. And, the RSRP/RSRQ of the candidate target cell is equal to and/or above the received channel quality threshold during the certain amount of time, and/or
  The UE evaluates whether RSRP/RSRQ of the serving cell is equal to and/or below the received channel quality threshold during a certain amount of time. And, the RSRP/RSRQ of the serving cell is equal to and/or below the received channel quality threshold during the certain amount of time.

Step 3-4) The UE initiates a timer (e.g., T304) when the autonomous HO condition for the candidate target cell is satisfied. The timer T304 value can be further provided as a part (e.g., the autonomous HO condition) of the HO assistance information. Also, the UE initiates a procedure (e.g., random access procedure) to connect to the candidate target cell when the autonomous HO condition for the candidate target cell is satisfied. If the UE considers that the random access is successful (e.g., MAC indicates the successful reception of a PDCCH transmission addressed to C-RNTI) (i.e., HO to the candidate target cell is successful), the UE stops the running timers (e.g., the validity timer, the timer T304), applies configuration for the candidate target cell and discards configuration for other candidate target cells.

Meanwhile, the UE may determine that HO to the candidate target cell (i.e., one cell) fails when any one of at least the followings occurs:
  The above timer T304 expires for the candidate target cell, and
  The number of random access trials (e.g., the number of random access preamble transmissions) to one cell (i.e., the candidate target cell) reaches the maximum threshold number before succeeding random access.

Step 5) If the UE may determine that HO to the candidate target cell (i.e., one cell) is failed, the UE stops a procedure to connect to the candidate target cell (e.g., stops trying to connect to the candidate target cell), and selects/measures a next candidate target cell, if any.

Step 6) The UE determines whether new candidate target cell is listed in the received HO assistance information and whether the new candidate target cell satisfies the autonomous HO condition.

Step 7) If new candidate target cell is listed in the HO assistance information and the new candidate target cell satisfies the autonomous HO condition, the UE tries to connect to the new candidate target cell, which involves performing a random access procedure to the new candidate target cell using the provided contention-free random access resources (e.g. time/frequency/dedicated preamble/beam) and/or contention-based random access resources. The UE starts from Step 3.

Step 8) If new candidate target cell is not listed in the HO assistance information or all of new candidate target cells listed in the HO assistance information does not satisfy the autonomous HO condition, the UE determines that overall HO is failed. Also, if the UE determines the HO assistance information is not valid (e.g., the validity timer for the HO assistance information expires), the UE discards the HO assistance information. After trying to connect to one cell autonomously (i.e., performing random access based on autonomous HO procedure), if the HO assistance information is not valid anymore and if the UE does not succeed in autonomous HO procedure, the UE determines that overall HO is failed. If the overall HO is failed, the UE performs RRC connection reestablishment procedure.

FIG. 11 is a block diagram of a communication apparatus according to an embodiment of the present invention.

The apparatus shown in FIG. 11 can be a user equipment (UE) and/or eNB (or gNB) adapted to perform the above mechanism, but it can be any apparatus for performing the same operation.

As shown in FIG. 11, the apparatus may comprises a DSP/microprocessor (110) and RF module (transceiver; 135). The DSP/microprocessor (110) is electrically connected with the transceiver (135) and controls it. The apparatus may further include power management module (105), battery (155), display (115), keypad (120), SIM card (125), memory device (130), speaker (145) and input device (150), based on its implementation and designer's choice.

Specifically, FIG. 11 may represent a UE comprising a receiver (135) configured to receive radio signals from a network, and a transmitter (135) configured to transmit radio signals to the network. These receiver and the transmitter can constitute the transceiver (135). This processor (110) is connected to the transceiver (135: receiver and transmitter), and configured to implement the procedures and/or methods proposed by the present invention.

Also, FIG. 11 may represent a network apparatus (e.g., eNB or gNB) comprising a transmitter (135) configured to transmit radio signals to a UE and a receiver (135) configured to receive radio signals from the UE. These transmitter and receiver may constitute the transceiver (135). The network further comprises a processor (110) connected to the transmitter and the receiver. This processor (110) is connected to the transceiver (135: receiver and transmitter), and configured to implement the procedures and/or methods proposed by the present invention.

The embodiments of the present invention described herein are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from essential characteristics of the present invention. The above embodiments are therefore to be construed in all aspects as illustrative and not restrictive. The scope of the invention should be determined by the appended claims, not by the above description, and all changes coming within the meaning of the appended claims are intended to be embraced therein.

INDUSTRIAL APPLICABILITY

While the above-described method has been described centering on an example applied to the 3GPP LTE and NR system, the present invention is applicable to a variety of wireless communication systems in addition to the 3GPP LTE and NR system.

The invention claimed is:

1. A method for a user equipment (UE) to perform a handover procedure in a wireless communication system, the method comprising:
   receiving handover-related information for a plurality of candidate target cells,
   wherein the handover-related information includes contention-free random access resource;
   determining a handover to one of the plurality of candidate cells is failed; and
   based on the determining, performing a cell selection procedure to select a cell,
   wherein, based on the selected cell being in the plurality of candidate cells in the handover-related information, a connect to the selected cell is performed using the contention-free random access resource in the handover-related information, and
   wherein, based on the selected cell not being in the plurality of candidate cells in the handover-related information, a radio resource control (RRC) connection re-establishment procedure is performed.

2. The method of claim 1, wherein the handover to the one of the plurality of candidate cells is determined as being failed based on expiration of a timer.

3. The method of claim 1, further comprising:
   initiating a timer for the selected cell, based on the UE determining that the selected cell satisfies a handover condition.

4. The method of claim 1, further comprising:
   initiating a timer when the handover assistance information is received; and
   performing the RRC connection re-establishment procedure based on the timer being expired.

5. A User Equipment (UE) for operating in a wireless communication system, the UE comprising:
   a Radio Frequency (RF) module including a transceiver; and
   a processor operably coupled with the RF module and configured to:
   receive handover-related information for a plurality of candidate target cells,
   wherein the handover-related information includes contention-free random access resource;
   determine a handover to one of the plurality of candidate cells is failed; and
   based on the determining, perform a cell selection procedure to select a cell, wherein, based on the selected cell being in the plurality of candidate cells in the handover-related information, a connect to the selected cell is performed using the contention-free random access resource in the handover-related information, and wherein, based on the selected cell not being in the plurality of candidate cells in the handover-related information, a radio resource control (RRC) connection re-establishment procedure is performed.

6. The UE of claim 5, wherein the handover to the one of the plurality of candidate cells is determined as being failed based on expiration of a timer.

7. The UE of claim 5, wherein the processor is further configured to:

initiate a timer for the selected cell, based on the UE determining that the selected cell satisfies a handover condition.

8. The UE of claim 5, wherein the processor is further configured to:

initiate a timer when the handover assistance information is received, and perform the RRC connection re-establishment procedure based on the timer being expired.

* * * * *